(12) United States Patent
Yamaguchi

(10) Patent No.: US 7,860,636 B2
(45) Date of Patent: Dec. 28, 2010

(54) ECO-RUN CONTROL DEVICE AND ENGINE RESTART METHOD

(75) Inventor: Kazuhi Yamaguchi, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 330 days.

(21) Appl. No.: 12/081,472

(22) Filed: Apr. 16, 2008

(65) Prior Publication Data

US 2008/0262707 A1 Oct. 23, 2008

(30) Foreign Application Priority Data

Apr. 20, 2007 (JP) .............................. 2007-112413

(51) Int. Cl.
*F02N 11/08* (2006.01)
*F02D 17/00* (2006.01)
*F02D 15/00* (2006.01)

(52) U.S. Cl. .................................... 701/112; 123/179.3

(58) Field of Classification Search ............. 123/179.3, 123/179.4; 701/112, 113
See application file for complete search history.

(56) References Cited

U.S. PATENT DOCUMENTS

| | | | |
|---|---|---|---|
| 6,275,759 B1 * | 8/2001 | Nakajima et al. | 701/54 |
| 6,443,126 B1 * | 9/2002 | Morimoto et al. | 123/339.15 |
| 7,080,617 B2 * | 7/2006 | You | 123/179.4 |
| 2004/0149246 A1 * | 8/2004 | Itoh et al. | 123/179.4 |
| 2004/0221828 A1 | 11/2004 | Ries-Mueller et al. | |
| 2005/0103302 A1 | 5/2005 | You | |
| 2005/0131621 A1 | 6/2005 | Schuster et al. | |

2009/0216430 A1 8/2009 Lecole et al.

FOREIGN PATENT DOCUMENTS

| | | |
|---|---|---|
| EP | 1 726 824 A2 | 11/2006 |
| EP | 1 770 266 A1 | 4/2007 |
| FR | 2 875 551 A1 | 3/2006 |
| JP | A-4-240997 | 8/1992 |
| JP | A-2002-70699 | 3/2002 |
| JP | A-2002-303235 | 10/2002 |
| JP | A-2003-184713 | 7/2003 |
| JP | A-2003-322040 | 11/2003 |
| JP | A-2005-036795 | 2/2005 |
| JP | A-2005-090301 | 4/2005 |
| JP | A-2006-51922 | 2/2006 |
| JP | A-2006-233917 | 9/2006 |
| JP | A-2006-336483 | 12/2006 |
| WO | WO 2007/043342 A1 | 4/2007 |

OTHER PUBLICATIONS

European Search Report dated Oct. 19, 2009 for European Patent Application No. 08 15 4067.

* cited by examiner

*Primary Examiner*—Stephen K Cronin
*Assistant Examiner*—Arnold Castro
(74) *Attorney, Agent, or Firm*—Oliff & Berridge, PLC (57) ABSTRACT

An eco-run control device sends an engine stop request to an engine control device when predetermined stop requirements are satisfied, causes the engine control device to perform an engine stop control operation, and drives a starter to restart the engine when predetermined restart requirements are satisfied during the engine stop control operation. This eco-run control device includes: a detecting unit that detects a starting operation to start the engine; and a control unit that causes the starter to restart the engine, if the starting operation is detected during the engine stop control operation and the engine speed is lower than a predetermined speed.

7 Claims, 8 Drawing Sheets

ECO-RUN CONTROL DEVICE AND ENGINE RESTART METHOD

BACKGROUND OF THE INVENTION

1. Field of the Invention

The present invention relates to an eco-run control device that has an eco-run function to drive a vehicle while starting and stopping the engine, and to an engine restart method.

2. Description of the Related Art

In recent years, to improve fuel efficiency and reduce emission, there have been eco-run control devices mounted on vehicles. An eco-run control device issues an engine stop instruction when predetermined engine stop requirements are satisfied, and later issues an engine restart instruction to drive an engine starting motor when predetermined engine start requirements are satisfied.

An eco-run ECU that performs eco-run control operations determines whether to stop the engine and whether to start the engine, based on an eco-run allowing signal and an eco-run prohibiting signal transmitted from another ECU, and signals transmitted from various sensors and actuators.

Figure 1:
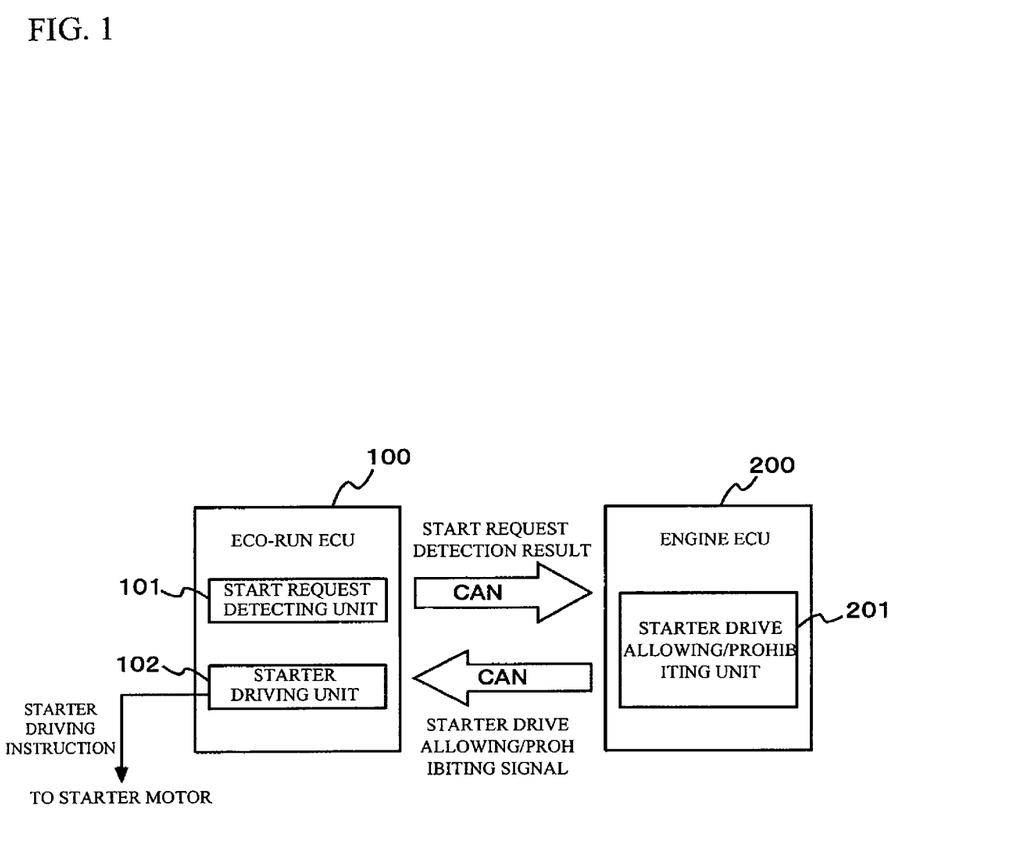
FIG. 1 shows conventional communication procedures between an eco-run ECU and an engine ECU.

FIG. 1 illustrates the structures of an eco-run ECU 100 and an engine ECU 200 that controls the engine. When the vehicle comes to a halt and enters an eco-run control state, the eco-run ECU 100 outputs an eco-run start request to the engine ECU 200. Upon receipt of the eco-run start request, the engine ECU 200 cuts the fuel supply and stops the engine.

When the engine is started, a start request detecting unit 101 of the eco-run ECU 100 detects a starting operation of the driver (a shift operation, a brake operation, a clutch operation, or the like), and transmits an engine start request to the engine ECU 200. Based on information such as the engine speed, a starter drive allowing/prohibiting unit 201 of the engine ECU 200 determines whether the engine needs to be started by a starter motor. If the starter drive allowing/prohibiting unit 201 determines that the engine needs to be started by the starter motor, a starter drive allowing signal is output to the eco-run ECU 100. If the starter drive allowing/prohibiting unit 201 determines that the engine does not need to be started by the starter motor, a starter drive prohibiting signal is output to the eco-run ECU 100. The eco-run ECU 100 has a starter motor driving unit 102. When the starter drive allowing signal is output from the engine ECU 200, the starter motor driving unit 102 drives the starter motor to start the engine.

Japanese Unexamined Patent Publication No. 2006-233917 discloses a monitoring electronic device that monitors an idling stop control electronic device for an error. If there is an error in the idling stop control electronic device, the monitoring electronic device puts the starter motor into a stopped state.

However, if there is failure in the communication circuit in the engine ECU, a disconnection in the communication line, a noise in a communication, or the like, the eco-run ECU cannot receive the starter drive allowing signal or the starter drive prohibiting signal from the engine ECU side. In such a case, the eco-run ECU cannot determine anything, and there is a possibility of engine failure. Japanese Unexamined Patent Publication No. 2006-233917 does not disclose a technique for preventing engine failure.

Also, even if the communication between the engine ECU and the eco-run ECU is in a normal state, engine failure might occur before a response is received from the engine ECU, due to a communication delay.

Figure 2:
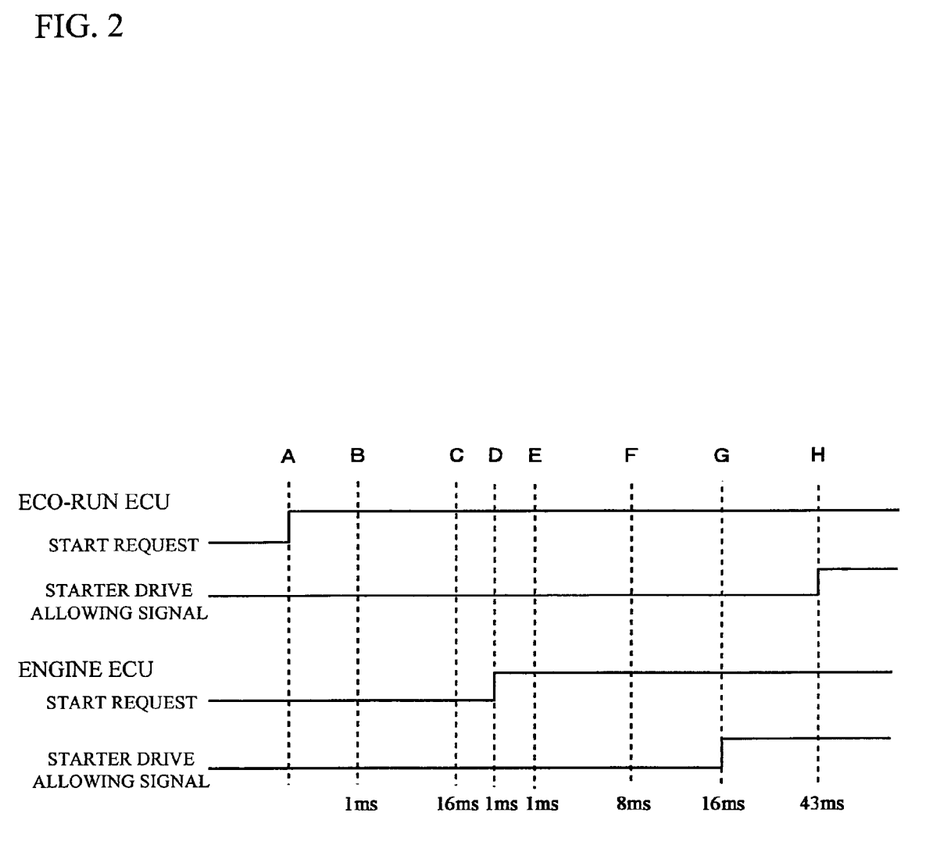
FIG. 2 illustrates the time periods required for communications between the eco-run ECU and the engine ECU.

FIG. 2 shows an example of a communication between the eco-run ECU 100 and the engine ECU 200. When the start request detecting unit 101 of the eco-run ECU 100 detects a starting operation of the user (the timing A in FIG. 2), the information about the detection of the start request is written in a RAM of a communication end that communicates with the engine ECU 200 (the timing B in FIG. 2: 1 ms). The detection result written in the RAM of the communication end is transmitted to the engine ECU 200 by a communication application (the timing C in FIG. 2: 16 ms). When receiving the information from the eco-run ECU 100 (the timing D in FIG. 2: 1 ms), the engine ECU 200, writes the received information in the communication RAM through a register (the timing E in FIG. 2: 1 ms).

The information written in the communication RAM is then written in a RAM to be used by the application on the side of the engine ECU 200 (the timing F in FIG. 2: 8 ms), and is read by the engine ECU 200 to determine whether the engine needs to be started by the starter motor (the timing G in FIG. 2: 16 ms). The determination result is then transmitted from the engine ECU 200 to the eco-run ECU 100. This transmission is performed through the same procedures as those of a communication from the eco-run ECU 100 to the engine ECU 200, and takes the same amount of communication time as a communication from the eco-run ECU 100 to the engine ECU 200 (the timing H in FIG. 2: 43 ms).

Since approximately 100 ms is required at worst between the detection of a starting operation of the driver and the reception of the starter drive allowing/prohibiting signal from the engine ECU 200, there is a possibility that engine failure occurs before a response is received from the engine ECU 200.

SUMMARY OF THE INVENTION

It is therefore an object of the present invention to provide an eco-run control device and an engine restart method in which the above disadvantages are eliminated.

A more specific object of the present invention is to provide an eco-run control device that checks the engine operating state and spontaneously causes the starter to start the engine, so as to prevent engine failure. Another specific object of the present invention is to provide an engine restart method.

According to an aspect of the present invention, there is provided an eco-run control device that sends an engine stop request to an engine control device when predetermined stop requirements are satisfied, causes the engine control device to perform an engine stop control operation, and drives a starter to restart the engine when predetermined restart requirements are satisfied during the engine stop control operation, the eco-run control device including: a detecting unit that detects a starting operation to start the engine; and a control unit that causes the starter to restart the engine, when the starting operation is detected during the engine stop control operation and a speed of the engine is lower than a predetermined speed. With the above structure, the engine operating state is checked, and the eco-run control device spontaneously causes the starter to start the engine, so as to prevent engine failure.

According to another aspect of the present invention, there is provided an engine restart method including the steps of: performing an idling stop by sending an engine fuel supply cut request to an engine control device, when predetermined stop requirements are satisfied; detecting a starting operation to start the engine, after the fuel supply is cut; and causing a starter to restart the engine, when the starting operation is detected and a speed of the engine becomes lower than a predetermined speed. With this structure, the engine operating state is checked, and the eco-run control device spontaneously causes the starter to start the engine, so as to prevent engine failure.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

The following is a description of preferred embodiments of the present invention, with reference to the accompanying drawings.

Embodiment

Figure 3:
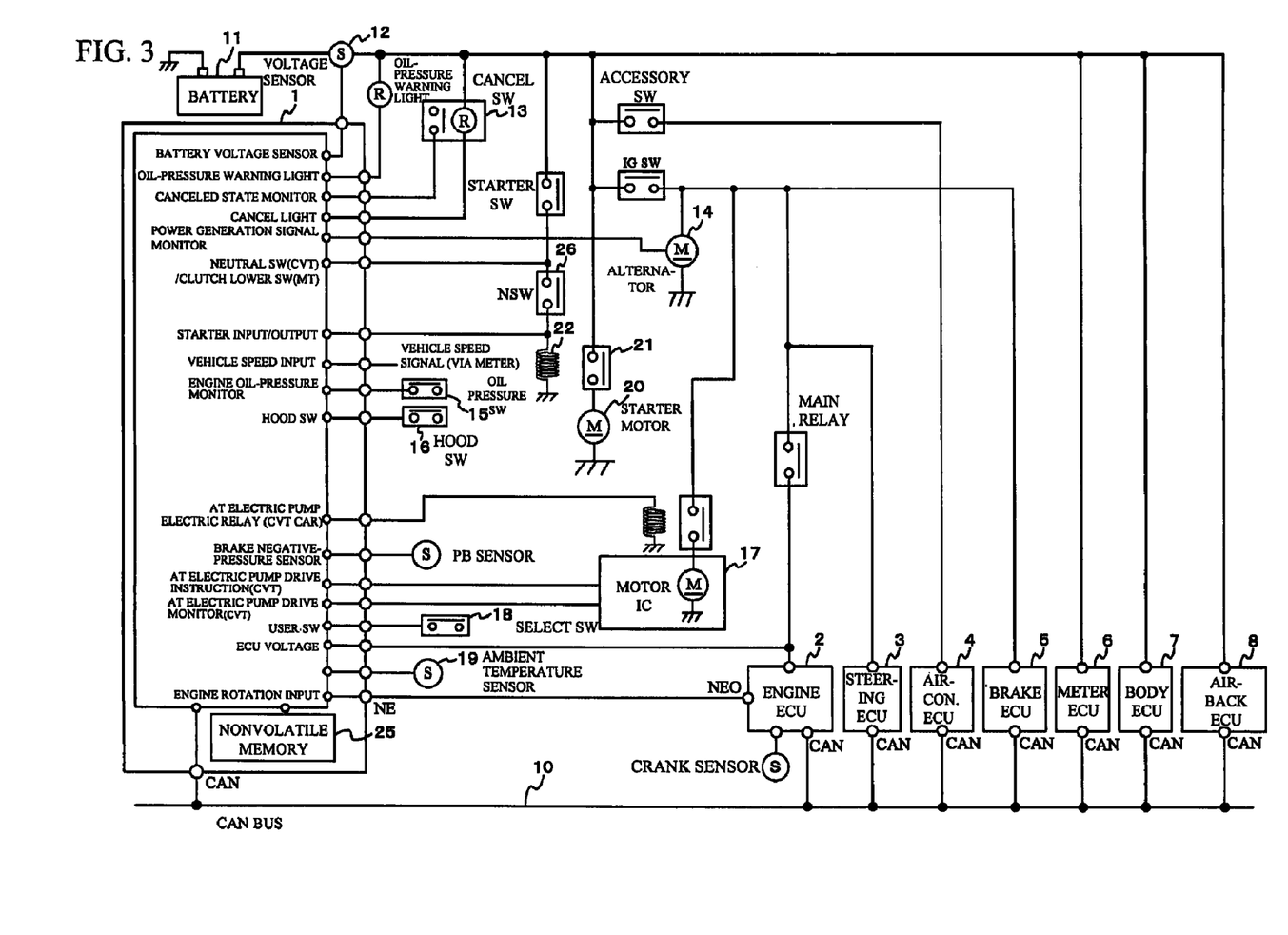
FIG. 3 illustrates an eco-run ECU, the circuits around the eco-run ECU, and ECUs that perform CAN communications with the eco-run ECU in accordance with the present invention.

Referring first to FIG. 3, the structure of this embodiment is described in detail. In this embodiment, an eco-run ECU (this eco-run ECU includes the controller, the starter drive request transmitting unit, and the starter drive controller of the present invention) 1 and other ECUs are connected to a CAN bus 10. In FIG. 3, the ECUs that perform CAN communications with the eco-run ECU 1 are an engine ECU 2, a steering ECU 3, an air-conditioner ECU 4, a brake ECU 5, a meter ECU 6, a body ECU 7, and an air-bag ECU 8. However, the ECUs that can be employed in this embodiment are not limited to those ECUs.

The engine ECU 2 is connected to an EFI (Electronic Fuel Injection) that electronically controls the amount of fuel injection to the engine. With this arrangement, the engine ECU 2 controls engine outputs, and adjusts the driving speed.

The steering ECU 3 electronically controls the steering angle of the steering unit that steers the front wheels, so as to adjust the driving direction of the vehicle.

The air-conditioner ECU 4 is connected to an operation unit (not shown) that is designed to set the temperature of a vehicle air-conditioning device (not shown) and selects an air outlet or the like. Based on the detected values of an ambient temperature sensor 19, an inside temperature sensor (not shown), and an insolation sensor (not shown), the air-conditioner ECU 4 performs various control operations in accordance with the settings through the operation unit and the likes.

The brake ECU 5 actuates a brake such as a disk brake or a drum brake, so as to electronically control the vehicle to reduce the speed or stop.

The meter ECU 6 receives detection signals from various sensors (not shown), and performs various operations. By doing so, the meter ECU 6 generates outputs for displaying the vehicle traveling speed, the engine speed, the shift position, the remaining amount of fuel, and the water temperature.

The body ECU 7 controls vehicle-mounted mechanisms such as a door lock mechanism or a power window mechanism.

The air-bag ECU 8 activates an air bag, when a G sensor (not shown) senses a collision of the vehicle.

The eco-run ECU 1 also has an input terminal for inputting signals from various sensors, an output terminal for switching on and off a switch, and the likes.

For example, the eco-run ECU 1 further includes: a terminal for inputting a sensor signal from a voltage sensor 12 that detects the voltage of a battery 11; a terminal that monitors the state of an eco-run cancel switch 13 for canceling an eco-run; a terminal that monitors the power generating state of an alternator (a generator) 14; a vehicle speed input terminal; a terminal that detects the oil pressure with an oil pressure switch 15 provided on an oil passage; a terminal that inputs a signal from a hood switch 16 that outputs signals in accordance with the opening/closing states of the front hood and the rear hood of the vehicle; a terminal that outputs a driving signal to a monitor IC 17 that controls the driving of an electric pump; a terminal that monitors the driving of the electric pump; a user SW terminal that detects an operation of a select switch 18 by the driver; a terminal that inputs the results of measurement carried out by the ambient temperature sensor 19; and a terminal that receives the engine speed from the engine ECU 2.

The eco-run ECU 1 also has a detecting unit that detects starting operations such as a shift operation, a brake operation, and a clutch operation performed by the driver.

Detection of a shift operation is performed by the eco-run ECU 1 receiving and judging information from a shift position sensor for detecting the operation position of a shift lever (not shown) through the engine ECU 2. Detection of a brake operation is performed by the eco-run ECU 1 receiving and judging information from a brake master cylinder pressure sensor (not shown) through the brake ECU 5. Detection of a clutch operation is performed by the eco-run ECU 1 inputting a signal from a clutch lower switch 26. The clutch lower switch 26 is a switch for detecting that the clutch is in the lower limit position (that the clutch is completely disengaged and is in a neutral state).

Other driver's starting operations include a key operation (when the key is turned to a start side), a starting operation using a push switch or the like, an operation to move the shift position into the traveling range, an accelerator pressing operation, an operation to switch the brake to a non-braking side, and a clutching operation.

The eco-run ECU 1 also automatically starts the engine, when an engine starting factor (such as a vehicle error, negative pressure release, or a start request from any other ECU) other than the above driver's starting operations is generated.

A starter motor 20 is connected to the power source line for supplying power from the battery 11. When a starter relay 21 is turned on by connecting the starter relay 21 to a coil 22, the power from the battery 11 is supplied to the starter motor 20. As the starter motor 20 is activated, the engine is started.

The starter relay 21 is also connected to the eco-run ECU 1. The starter relay 21 is turned on by a control signal transmitted from the eco-run ECU 1, so that the engine can be started by the starter motor 20.

A nonvolatile memory 25 connected to the eco-run ECU 1 stores processing programs and the likes to be used for controlling the eco-run ECU 1.

In this embodiment, when an engine starting operation performed by the driver is detected while the driving mode is being shifted to an eco-run mode by cutting the fuel supply to the engine, the eco-run ECU 1 can easily sense the timing for driving the starter motor. Even if there is not a starter driving instruction from the engine ECU 2, the engine can be driven in the starter driving timing under the control of the eco-run ECU 1.

The eco-run ECU 1 notifies the engine ECU 2 that there is an engine starting operation and that the fuel cut is interrupted, and stands by for a determination signal indicating whether to drive the starter from the engine ECU 2. If there is not a response from the engine ECU 2 over a predetermined period of time, and the engine speed is lower than a predetermined value, the eco-run ECU 1 determines that there is a possibility of engine failure. Therefore, the eco-run ECU 1 spontaneously performs driving with the starter motor, and restarts the engine.

Figure 4:
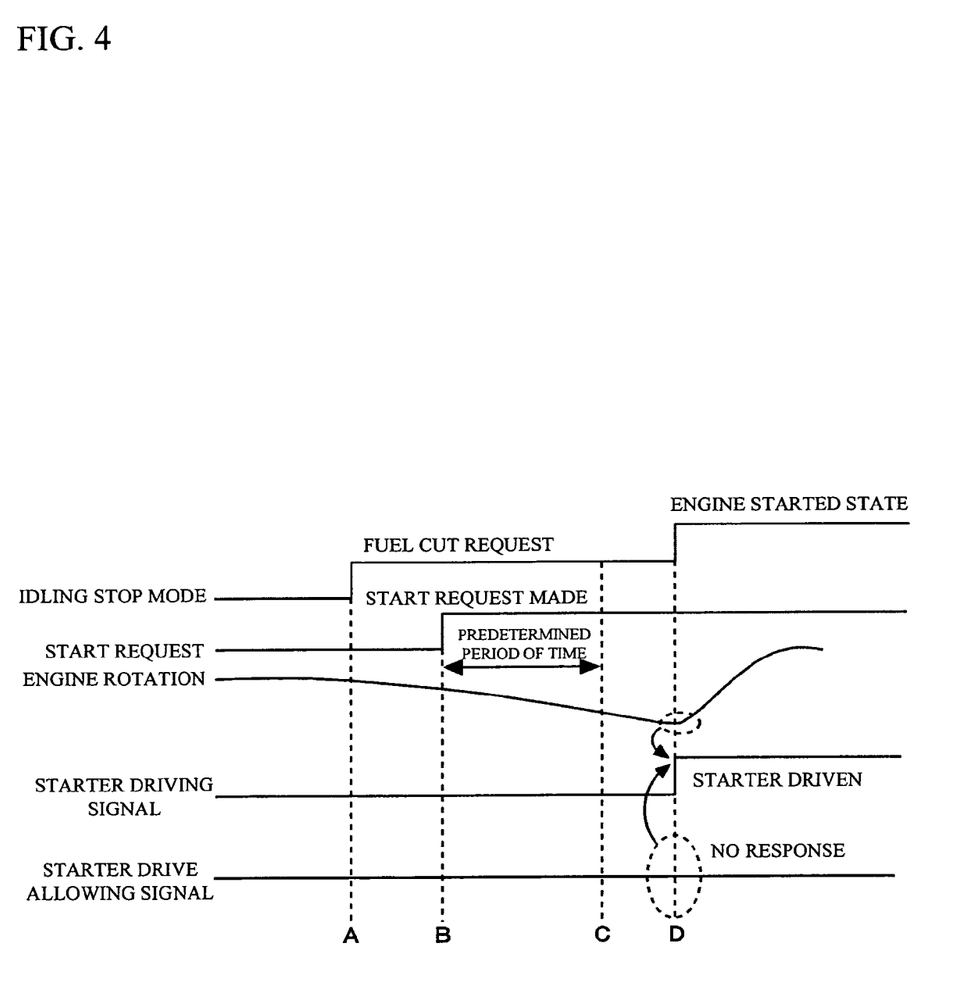
FIG. 4 is a timing chart showing the timings for processes to be carried out by the eco-run ECU.

FIG. 4 illustrates the operation to be performed by the eco-run ECU 1, starting from the time when the eco-run ECU 1 outputs a fuel cut request to the engine ECU 2 so as to enter the eco-run mode, until the time when the eco-run ECU 1 performs a control operation to restart the engine.

When the vehicle comes to a halt and is put into a state in which an idling stop can be performed, the eco-run ECU 1 outputs a fuel cut request to the engine ECU 2 (the timing A in FIG. 4). In response to the fuel cut request, the state of the vehicle is shifted to an idling stop stand-by state. In the idling stop stand-by state, the requirements for an idling stop are satisfied, and the fuel cut request has been issued to the engine ECU 2. When the eco-run ECU 1 detects a starting operation of the driver while the fuel supply to the engine is cut and the engine is stopped (the timing B in FIG. 4), the eco-run ECU 1 notifies the engine ECU 2 of the detection of the starting operation, and outputs a fuel cut interrupting request to the engine ECU 2. After that, the eco-run ECU 1 stands by for a determination signal from the engine ECU 2. However, if there is not a signal transmitted from the engine ECU 2 even after a predetermined period of time has passed (the timing C in FIG. 4), and if the engine speed becomes lower than a predetermined value (the timing D in FIG. 4), the eco-run ECU 1 causes the starter motor to start driving, so as to start the engine.

In a case where the predetermined period of time in which there is not a response from the engine ECU 2 has not passed, if the engine speed becomes lower than the predetermined speed, the eco-run ECU 1 spontaneously drives the starter motor, so as to prevent the engine from stalling.

There are four different states in the idling stop control. The first state is an "engine rotating state" in which a start of the engine has been completed, and the engine is rotating. The second state is the above described "idling stop stand-by state". The third state is an "idling stop state" in which the engine is stopped by the idling stop control. The fourth state is an "engine starting state" in which the starter is driven to start the engine.

Figure 5A:
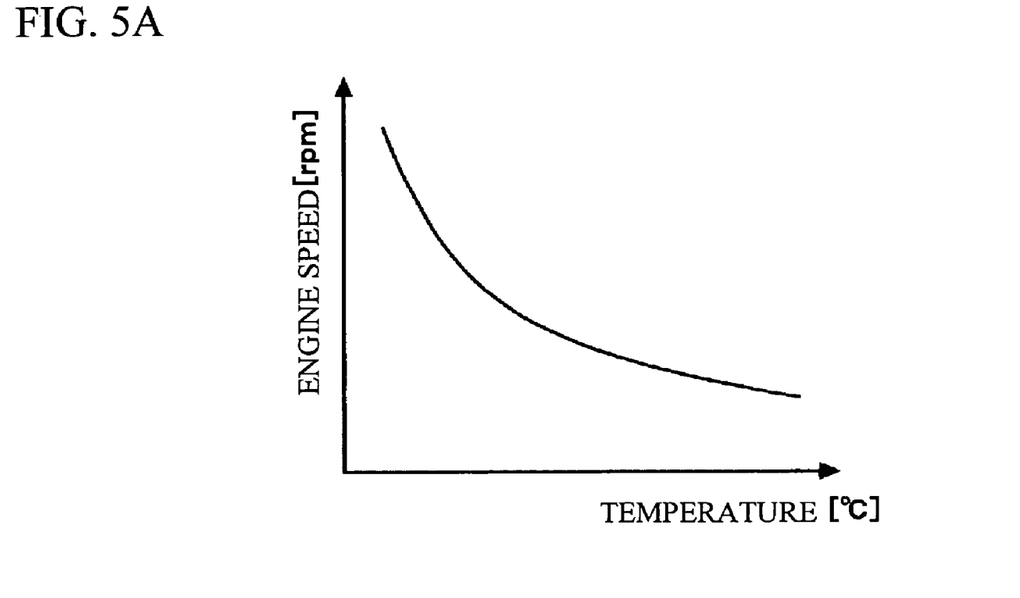
FIG. 5A shows a correction table for the engine speed, with at least one of the battery liquid temperature, the engine water temperature, and the ambient temperature being used as the parameter.

The engine speed, based on which the eco-run ECU 1 determines whether to drive the starter motor, can be corrected, with at least one of the battery liquid temperature, the engine water temperature, and the ambient temperature being used as the parameter. FIG. 5A shows the relationship between the one parameter (the battery liquid temperature, the engine water temperature, or the ambient temperature) and the engine speed corrected with the use of the parameter.

Figure 5B:
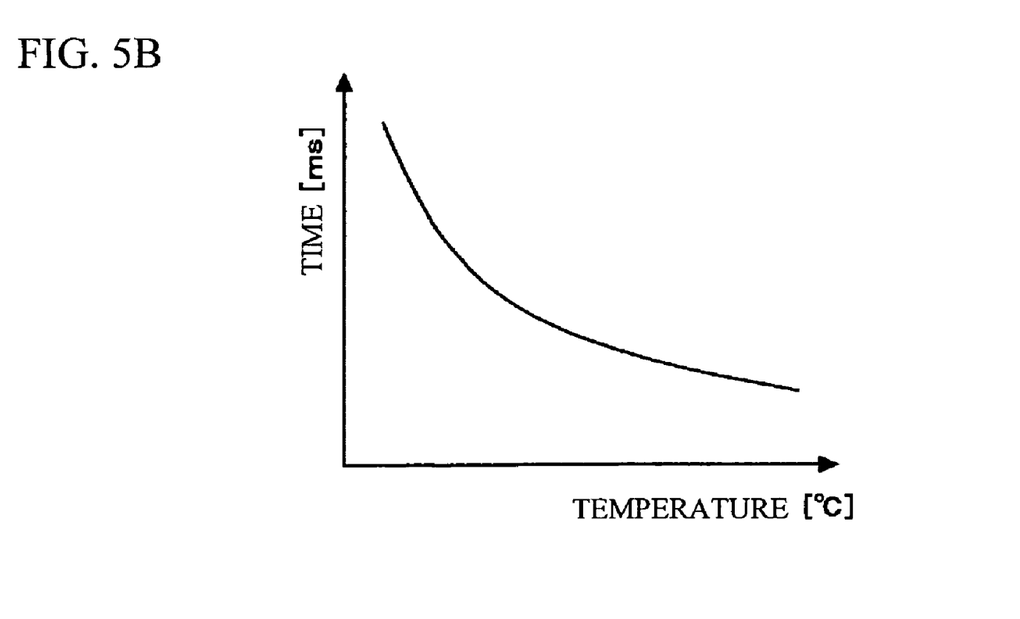
FIG. 5B shows a correction table for the predetermined period of time, with at least one of the battery liquid temperature, the engine water temperature, and the ambient temperature being used as the parameter.

Also, the predetermined period of time in which the eco-run ECU 1 stands by for a response from the engine ECU 2 can be corrected, with at least one of the battery liquid temperature, the engine water temperature, and the ambient temperature being used as the parameter. FIG. 5B shows the relationship between the one parameter (the battery liquid temperature, the engine water temperature, or the ambient temperature) and the predetermined period of time corrected with the use of the parameter.

Next, the operations to be performed by the eco-run ECU 1 and the engine ECU 2 are described, with reference to flowcharts. Referring first to the flowchart shown in FIG. 6, the operation to be performed on the side of the engine ECU 2 is described.

Figure 6:
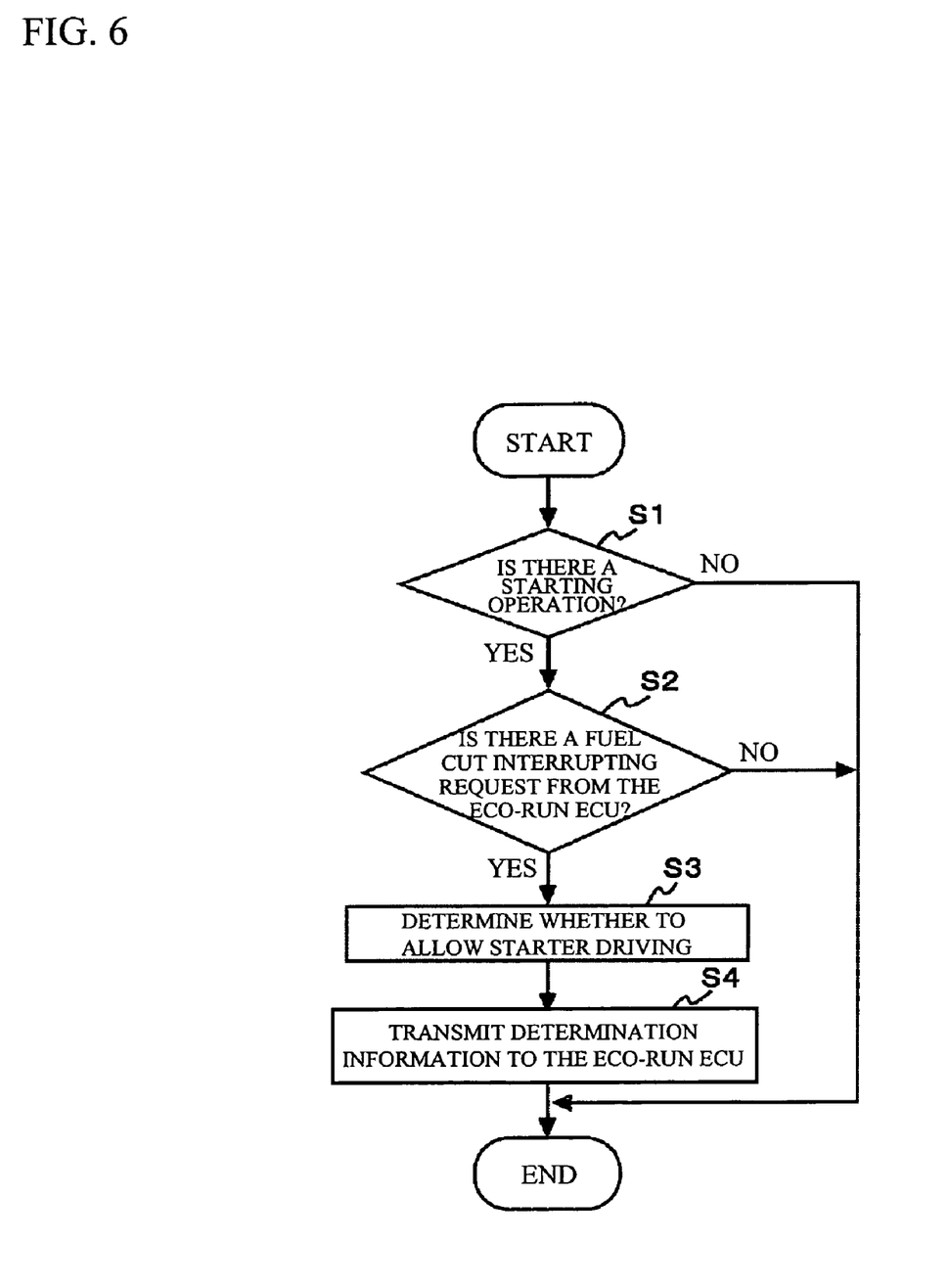
FIG. 6 is a flowchart showing the operation procedures to be carried out by the engine ECU.

When receiving a notification that starting operation detection from the eco-run ECU 1 (step S1), the engine ECU 2 determines whether there is a fuel cut interrupting request from the eco-run ECU 1 (step S2). If there is a fuel cut interrupting request from the eco-run ECU 1 ("YES" in step S2), the engine ECU 2 determines whether to allow the starter motor to start the engine, based on the engine speed, the cooling-water temperature, the time elapsed since a fuel cut, and the likes (step S3). In a case where the starter motor is allowed to start the engine, the engine ECU 2 transmits a starter drive allowing signal as determination information to the eco-run ECU 1. In a case where the starter motor is not allowed to start the engine, the engine ECU 2 transmits a starter drive prohibiting signal as the determination information to the eco-run ECU 1.

In a case where there is not a notification of starting operation detection from the eco-run ECU 1 ("NO" in step S1), or where there is not a fuel cut interrupting request from the eco-run ECU 1 ("NO" in step S2), the cut of the fuel supply to the engine is continued.

Figure 7:
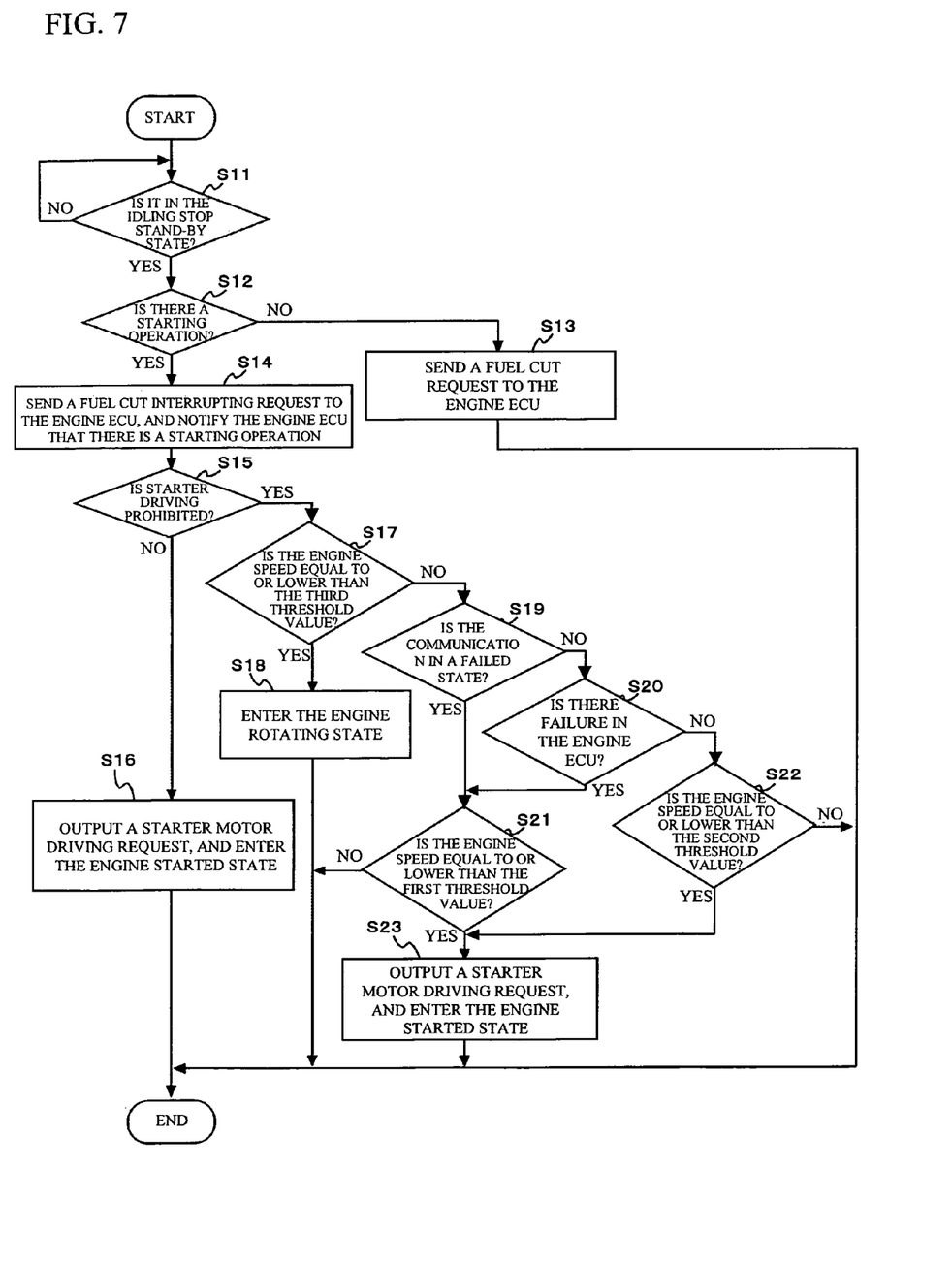
FIG. 7 is a flowchart showing the operation procedures to be carried out by the eco-run ECU.

Referring now to the flowchart shown in FIG. 7, the operation to be performed on the side of the eco-run ECU 1 is described.

After sending a fuel cut request to the engine ECU 2 and entering the idling stop stand-by state (step S11), the eco-run ECU 1 awaits a starting operation of the driver. If a starting operation of the driver is not detected ("NO" in step S12), the eco-run ECU 1 continues the fuel cut request to the engine ECU 2 (step S13).

If a starting operation of the driver is detected ("YES" in step S12), the eco-run ECU 1 sends a fuel cut interrupting request to the engine ECU 2, and notifies the engine ECU 2 of the detection of the driver's starting operation (step S14). After that, the eco-run ECU 1 determines whether the determination information that is sent from the engine ECU 2 at regular intervals and is stored in a memory is a starter drive prohibiting signal (step S15).

If the determination information sent from the engine ECU 2 does not serve as a starter drive prohibiting signal ("NO" in step S15), the eco-run ECU 1 outputs an engine drive request to the starter motor 20, and enters the engine starting state to restart the engine (step S16).

If the determination information serves as a starter drive prohibiting signal ("YES" in step S15), the eco-run ECU 1 determines whether the engine speed is equal to or higher than a third threshold value (step S17). The third threshold value is the value with which the eco-run ECU 1 can enter the engine rotating state by fuel injection, not by the starter motor driving. If the engine speed is equal to or higher than the third threshold value ("YES" in step S17), the eco-run ECU 1 enters the engine rotating state (step S18). If the engine speed is lower than the third threshold value ("NO" in step S17), the eco-run ECU 1 refers to information that indicates whether the communication with the engine ECU 2 is in a failed state (step S19). How to determine whether the communication with the engine ECU 2 is in a failed state will be described later.

If the communication with the engine ECU 2 is not in a failed state ("NO" in step S19), the eco-run ECU 1 refers to information that indicates whether the engine ECU 2 is in a failed state (step S20). How to determine whether the engine ECU 2 is in a failed state will also be described later.

If the communication with the engine ECU 2 is determined to be in a failed state in step S19, or if the engine ECU 2 is determined to be in a failed state in step S20 ("YES" in step S19 or "YES" in step S20), the eco-run ECU 1 determines whether the engine speed is equal to or lower than a first threshold value (step S21). If the engine speed is equal to or lower than the first threshold value ("YES" in step S21), the eco-run ECU 1 outputs an engine drive request to the starter motor, and enters the engine starting state to restart the engine (step S23).

If the communication with the engine ECU 2 is determined not to be in a failed state, and the engine ECU 2 is determined not to be in a failed state ("NO" in step S19 and "NO" in step S20), the eco-run ECU 1 determines whether the engine speed is equal to or lower than a second threshold value (step S22). If the engine speed is equal to or lower than the second threshold value ("YES" in step S22), the eco-run ECU 1 outputs an engine drive request to the starter motor, and enters the engine starting state to restart the engine (step S23). The engine speed set at the second threshold value is lower than the engine speed set at the first threshold value. In a case where a rapid decrease in the engine speed is detected even though neither communication failure nor a failed state of the engine ECU is detected, the engine must be started immediately. Therefore, the engine speed set at the second threshold value is lower than the engine speed set at the first threshold value. In other words, the eco-run ECU 1 awaits a starter drive instruction from the engine ECU 2, as long as there is no communication failure.

Also, in a case where the engine speed gradually decreases, and communication failure or a failed state of the engine ECU 2 is detected, correct determination information cannot be sent from the engine ECU 2. Therefore, driving by the starter motor is performed at a slightly high engine speed.

If the engine speed is determined to be higher than the first threshold value in step S21 ("NO" in step S21), or the engine speed is determined to be higher than the second threshold value in step S22 ("NO" in step S22), the eco-run ECU 1 monitors changes in the engine speed.

As described above, in this embodiment, the eco-run ECU 1 checks the engine operating state, and spontaneously causes the starter motor to start the engine. In this manner, engine failure can be prevented.

Also, the eco-run ECU 1 determines whether there is an error in the communication with the engine ECU 2, and determines whether there is failure in the engine ECU 2. Based on the determination results, the eco-run ECU 1 allows the starter motor to restart the engine. Accordingly, driving by the starter motor is performed only when necessary.

Even if there is not an error in the communication with the engine ECU 2 or there is no failure in the engine ECU 2, the eco-run ECU 1 spontaneously causes the starter motor to start the engine when the engine speed becomes lower than the second threshold value. In this manner, engine failure can be prevented.

Figure 8:
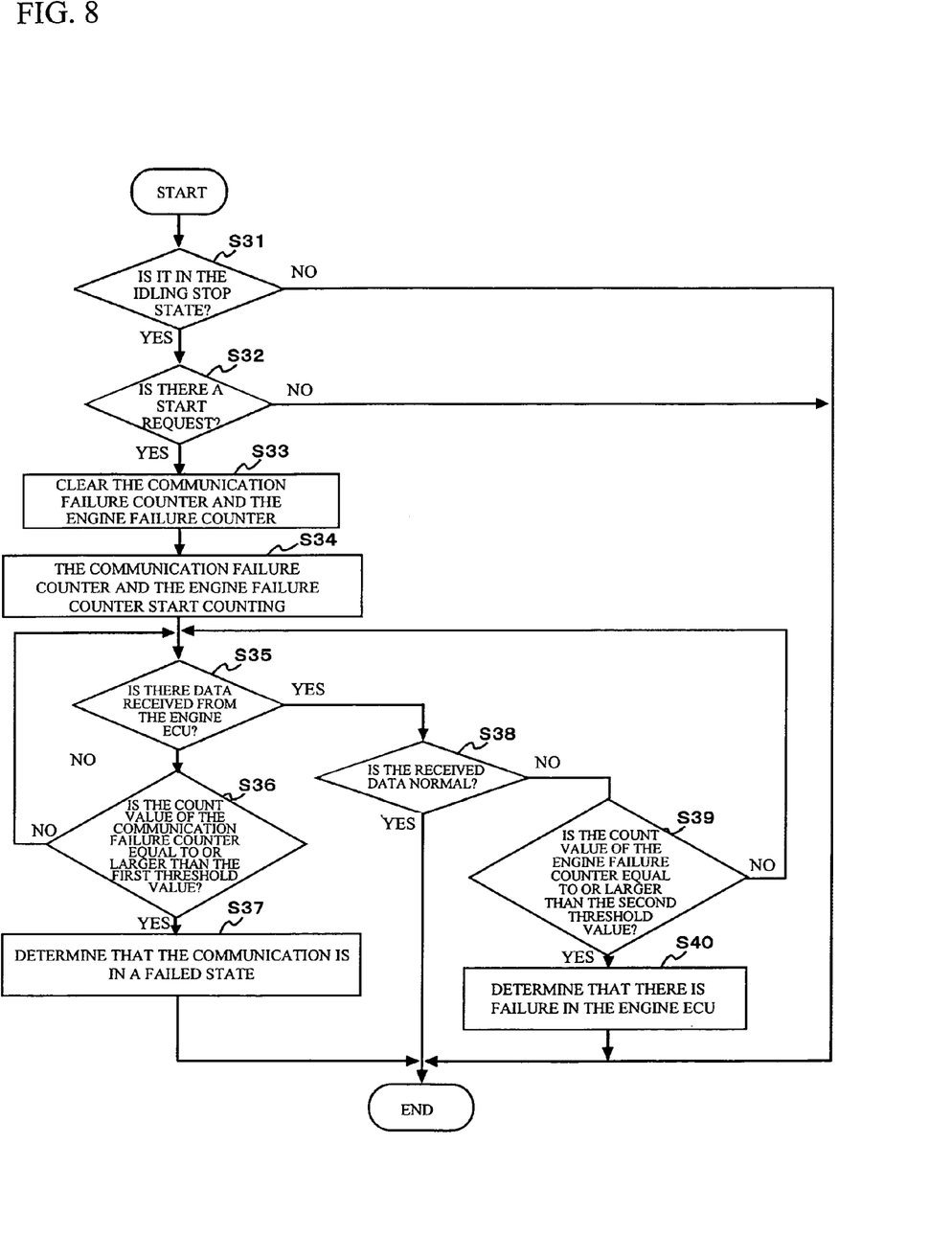
FIG. 8 is a flowchart showing the procedures for determining whether there is communication failure and there is failure in the engine ECU.

Referring now to the flowchart shown in FIG. 8, the procedures to be carried out by the eco-run ECU 1 to determine whether there is a failed communication and whether there is failure in the engine ECU are described.

When there is a start request ("YES" in step S32) in the idling stop stand-by state ("YES" in step S31), the eco-run ECU 1 resets a communication failure counter and an engine failure counter (step S33). The reset communication failure counter and the reset engine failure counter start counting (step S34).

The eco-run ECU 1 awaits data transmission from the engine ECU 2 (step S35). If there is not data transmitted from the engine ECU 2 ("NO" in step S35), the eco-run ECU 1 determines whether the count value of the communication failure counter is equal to or larger than the first threshold value (step S36). If the count value of the communication failure counter is not equal to or larger than the first threshold value ("NO" in step S36), the eco-run ECU 1 further awaits data transmission from the engine ECU 2. If the count value of the communication failure counter is equal to or larger than the first threshold value ("YES" in step S36), the eco-run ECU 1 determines that the communication with the engine ECU 2 is in a failed state (step S37).

If there is data transmitted from the engine ECU 2 ("YES" in step S35), the eco-run ECU 1 determines whether the received data is normal data (step S38). If the received data is not normal data ("NO" in step S38), the eco-run ECU 1 determines whether the count value of the engine failure counter is equal to or larger than the second threshold value (step S39). If the count value of the engine failure counter is smaller than the second threshold value ("NO" in step S39), the eco-run ECU 1 awaits the next data transmission from the engine ECU 2. When receiving the next data, the eco-run ECU 1 determines whether the next data is normal data (step S38). If the next data transmitted from the engine ECU 2 is not normal data, and the count value of the engine failure counter is equal to or larger than the second threshold value ("YES" in step S39), the eco-run ECU 1 determines that the engine ECU 2 is in a failed state (step S40). If the eco-run ECU 1 receives normal data from the engine ECU 2 before the count value of the engine failure counter becomes equal to or larger than the second threshold value ("YES" in step S38), the eco-run ECU 1 determines that there is not an error in the communication with the engine ECU 2 and there is no failure in the engine ECU 2, and then ends this operation.

Although a preferred embodiment of the present invention has been shown and described, it would be appreciated by those skilled in the art that changes may be made in the embodiment without departing from the principles and spirit of the invention, the scope of which is defined in the claims and their equivalents.

Further, the requirements for starting the engine are not limited to starting operations by the driver (for example, the engine may be started when the battery capacity is small, or an air conditioner or the like that results in larger load is activated).

The present invention is not limited to idling stops, and may be applied to any eco-run control operations for stopping the engine and then restarting the engine when predetermined requirements are satisfied even if there is not an engine stopping operation (an operation to turn off the key or a switch operation to stop the engine) by the user. The present invention may also be applied to cases where the engine of a hybrid vehicle is stopped while the hybrid vehicle is running.

Also, the present invention is not limited to engine stop control operations.

Finally, the above-mentioned aspects of the present invention are summarized as follows.

According to an aspect of the present invention, there is provided an eco-run control device that sends an engine stop request to an engine control device when predetermined stop requirements are satisfied, causes the engine control device to perform an engine stop control operation, and drives a starter to restart the engine when predetermined restart requirements are satisfied during the engine stop control operation, the eco-run control device including: a detecting unit that detects a starting operation to start the engine; and a control unit that causes the starter to restart the engine, when the starting operation is detected during the engine stop control operation and a speed of the engine is lower than a predetermined speed. With the above structure, the engine operating state is checked, and the eco-run control device spontaneously causes the starter to start the engine, so as to prevent engine failure.

The eco-run control device may be configured so that the control unit causes the starter to restart the engine, when there is not data transmission from the engine control device over a predetermined period of time and the engine speed is lower than the predetermined speed. If there is an error detected in the communication line to the engine control device, the engine can be restarted by the starter when the engine speed becomes lower.

The eco-run control device may be configured so that the control unit causes the starter to restart the engine, when there is no normal data transmission from the engine control device over a predetermined period of time and the engine speed is smaller than the predetermined speed. If there is failure detected in the engine control device, the engine can be restarted by the starter when the engine speed becomes lower.

The eco-run control device may be configured so that the control unit causes the starter to start the engine, when the engine speed is smaller than the predetermined speed even though a signal to prohibit the starter from starting the engine is output from the engine control device. Engine failure can be prevented by the control unit causing the starter to start the engine in accordance with the engine speed, even if the control signal transmitted from the engine control devices does not correctly reflect the engine operating state due to a communication delay or the like.

According to another aspect of the present invention, there is provided an eco-run control device that is mounted on a vehicle and is capable of performing an eco-run control operation to stop an engine when predetermined stop requirements are satisfied and later restart the engine when predetermined restart requirements are satisfied, the eco-run control device including: a starter drive request transmitting unit that transmits a starter drive allowing request signal to an engine control device, when the predetermined start requirements are satisfied while the engine is being shifted to a stopped state through the eco-run control operation; and a starter drive control unit that drives a starter, when receiving a starter drive allowing signal from the engine control device after the starter drive request transmitting unit transmits the starter drive allowing result signal to the engine control device, the starter drive control unit driving the starter when there is not the starter drive allowing signal transmitted from the engine control device even after a predetermined period of time passes since the starter drive request transmitting unit transmits the starter drive slowing request signal. With this structure, the engine operating state is checked, and the eco-run control device spontaneously causes the starter to start the engine, so as to prevent engine failure.

According to yet another aspect of the present invention, there is provided an eco-run control device that is mounted on a vehicle and is capable of performing an eco-run control operation to stop an engine when predetermined stop requirements are satisfied and later restart the engine when predetermined restart requirements are satisfied, the eco-run control device including: a starter drive request transmitting unit that transmits a starter drive allowing request signal to an engine control device, when the predetermined start requirements are satisfied while the engine is being shifted to a stopped state through the eco-run control operation; and a starter drive control unit that drives a starter, when receiving a starter drive allowing signal from the engine control device after the starter drive request transmitting unit transmits the starter drive allowing result signal to the engine-control device, the starter drive control unit driving the starter when abnormal data is received a predetermined number of times or more often between the time when the starter drive request transmitting unit transmits the starter drive allowing request signal and the time when the starter drive allowing signal is received from the engine control device. With this structure, the engine operating state is checked, and the eco-run control device spontaneously causes the starter to start the engine, so as to prevent engine failure.

According to a further aspect of the present invention, there is provided an eco-run control device that is mounted on a vehicle and is capable of performing an eco-run control operation to stop an engine when predetermined stop requirements are satisfied and later restart the engine when predetermined restart requirements are satisfied, the eco-run control device including: a starter drive request transmitting unit that transmits a starter drive allowing request signal to an engine control device, when the predetermined start requirements are satisfied while the engine is being shifted to a stopped state through the eco-run control operation; and a starter drive control unit that drives a starter, when receiving a starter drive allowing signal from the engine control device after the starter drive request transmitting unit transmits the starter drive allowing result signal to the engine control device, the starter drive control unit driving the starter when detecting a decrease of the engine speed to a predetermined speed or lower between the time when the starter drive request transmitting unit transmits the starter drive allowing request signal and the time when the starter drive allowing signal is received from the engine control device. With this structure, the engine operating state is checked, and the eco-run control device spontaneously causes the starter to start the engine, so as to prevent engine failure.

According to a still further aspect of the present invention, there is provided an eco-run control device that is mounted on a vehicle and is capable of performing an eco-run control operation to stop an engine when predetermined stop requirements are satisfied and later restart the engine when predetermined restart requirements are satisfied, the eco-run control device including: a starter drive control unit that transmits a starter drive allowing request signal to an engine control device when the predetermined start requirements are satisfied, and drives a starter when receiving a starter drive allowing signal from the engine control device after transmitting the starter drive allowing request signal, the starter drive control unit driving the starter even when the starter drive allowing signal is not received from the engine control device, where there is at least failure in the engine control device or an error in a communication with the engine control device. With this structure, the engine operating state is checked, and the eco-run control device spontaneously causes the starter to start the engine, so as to prevent engine failure.

The present application is based on Japanese Patent Application No. 2007-112413 filed on Apr. 20, 2007, the entire disclosure of which is hereby incorporated by reference.

What is claimed is:

1. An eco-run control device that is mounted on a vehicle, drives a starter, and is capable of performing an eco-run control operation to stop an engine if predetermined stop requirements are satisfied and later restart the engine if predetermined restart requirements are satisfied, the eco-run control device comprising:
   a transmitting unit that transmits an engine start request signal to the engine control device while the engine is being shifted to a stopped state through the eco-run control operation if the predetermined start requirements are satisfied; and
   a starter drive control unit that determines whether to start the engine, wherein:
   (1) the starter drive control unit drives the starter if the engine control device receives the engine start request signal from the transmitting unit and the engine control device transmits a starter drive allowing signal to the starter drive control unit, and
   (2) the starter drive control unit drives the starter if the engine speed is decreased to a predetermined speed or lower even if the starter control unit does not receive the starter allowing signal from the engine control device, such that the starter drive control unit drives the starter after the transmitting unit transmits the engine start request signal to the engine control device, but before the starter drive control unit receives the starter drive allowing signal from the engine control device.

2. An eco-run control device that is mounted on a vehicle, drives a starter, and is capable of performing an eco-run control operation to stop an engine if predetermined stop requirements are satisfied and later restart the engine if predetermined restart requirements are satisfied, the eco-run control device comprising:
   a transmitting unit that transmits an engine start request signal for requesting interruption of fuel cutting to the engine control device if the predetermined start requirements are satisfied and the engine is being shifted to a stopped state after receiving a fuel cutoff request that is output by the eco-run control operation; and
   a starter drive control unit that determines whether to start the engine, wherein:
   (1) the starter drive control unit drives the starter if the engine control device receives the engine start request signal from the transmitting unit and the engine control device transmits a starter drive allowing signal to the starter drive control unit, and
   (2) the starter drive control unit drives the starter if the engine speed is decreased to a predetermined speed or lower even if the starter control unit does not receive the starter allowing signal from the engine control device, such that the starter drive control unit drives the starter after the transmitting unit transmits the engine start request signal to the engine control device, but before the starter control unit receives the starter drive allowing signal from the engine control device.

3. The eco-run control device according to claim 1, wherein the predetermined speed is lower than a threshold speed and an engine drive state can be shifted at the threshold speed without driving the starter.

4. The eco-run control device according to claim 1, wherein the starter drive control unit drives the starter if the engine speed is decreased to a first speed or lower, even if the eco-run control device does not determine an abnormal state of the engine control device and does not determine an abnormal communication between the engine control device and the eco-run control device.

5. The eco-run control device according to claim 4, wherein the starter drive control unit drives the starter if the engine speed is decreased to a second speed or lower, the second speed being higher than the first speed, and the eco-run control device determines that the engine control device is operating at an abnormal state or determines the abnormal of communication between the engine control and the eco-run control device.

6. An eco-run control system comprising:
   an eco-run device that is mounted on a vehicle and is capable of performing an eco-run control operation to stop an engine if predetermined stop requirements are satisfied and later restart the engine if predetermined restart requirements are satisfied;
   a starter; and
   an engine control device that controls the engine;
   the eco-run control device comprising:
      a transmitting unit; and
      a starter drive control unit that determines whether to start the engine, wherein:
      (1) the starter drive control unit drives the starter if the engine control device receives the engine start request signal from the transmitting unit, and the engine control device transmits a starter drive allowing signal to the starter drive control unit, and
      (2) the starter drive control unit drives the starter if the engine speed is decreased to a predetermined speed or lower even if the starter allowing signal is not received from the engine control device, such that the starter drive control unit drives the starter after the transmitting unit transmits the engine start request signal, but before the starter drive control unit receives the starter drive allowing signal from the engine control device.

7. A method for controlling an eco-run control device that is mounted on a vehicle and is capable of performing an eco-run control to stop an engine if predetermined stop requirements are satisfied and restart the engine if predetermined start requirements are satisfied later, wherein the method comprises:
   transmitting an engine start request signal to an engine control device if the predetermined start requirements are satisfied while the engine is being shifted to a stopped state through the eco-run control operation;
   driving a starter if the starter drive control unit receives a starter drive allowing signal transmitted from the engine control device; and
   driving the starter if the engine speed is decreased to a predetermined speed or lower even if the starter allowing signal is not received from the engine control device, such that the starter is driven after transmitting the engine start request signal, but before receiving the starter drive allowing signal from the engine control device.

* * * * *